(12) United States Patent
Rychlik (10) Patent No.: US 8,935,517 B2
(45) Date of Patent: Jan. 13, 2015

(54) SYSTEM AND METHOD FOR SELECTIVELY MANAGING A BRANCH TARGET ADDRESS CACHE OF A MULTIPLE-STAGE PREDICTOR

(75) Inventor: Bohuslav Rychlik, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 11/427,349

(22) Filed: Jun. 29, 2006

(65) Prior Publication Data

US 2008/0005543 A1  Jan. 3, 2008

(51) Int. Cl.
*G06F 9/30* (2006.01)
*G06F 9/38* (2006.01)

(52) U.S. Cl.
CPC .......... *G06F 9/3848* (2013.01); *G06F 9/3861* (2013.01); *G06F 9/3806* (2013.01); *G06F 9/3844* (2013.01)
USPC ........................................................ 712/238

(58) Field of Classification Search
USPC ........................................................ 712/238
See application file for complete search history.

(56) References Cited

U.S. PATENT DOCUMENTS

| | | | | |
|---|---|---|---|---|
| 5,327,536 A | * | 7/1994 | Suzuki | 712/238 |
| 5,740,415 A | * | 4/1998 | Hara | 712/238 |
| 5,890,008 A | * | 3/1999 | Panwar et al. | 712/15 |
| 5,964,870 A | * | 10/1999 | Malizewski | 712/240 |
| 6,263,427 B1 | * | 7/2001 | Cummins et al. | 712/236 |
| 6,601,161 B2 | * | 7/2003 | Rappoport et al. | 712/238 |
| 7,082,520 B2 | * | 7/2006 | Bonanno et al. | 712/236 |
| 7,266,676 B2 | * | 9/2007 | Tran et al. | 712/238 |
| 2002/0188833 A1 | | 12/2002 | Henry | |
| 2003/0041280 A1 | * | 2/2003 | Malcolm et al. | 714/4 |
| 2003/0212882 A1 | * | 11/2003 | Bonanno et al. | 712/238 |
| 2004/0172524 A1 | * | 9/2004 | Hoogerbrugge | 712/239 |
| 2004/0186985 A1 | * | 9/2004 | Tran et al. | 712/239 |
| 2004/0193856 A1 | * | 9/2004 | Wang et al. | 712/238 |
| 2004/0210749 A1 | * | 10/2004 | Biles | 712/240 |
| 2006/0236080 A1 | * | 10/2006 | Doing et al. | 712/238 |
| 2012/0042155 A1 | | 2/2012 | Rychlik | |

FOREIGN PATENT DOCUMENTS

| | | |
|---|---|---|
| EP | 0666538 | 8/1995 |
| JP | 7262006 A | 10/1995 |
| JP | 9062508 A | 3/1997 |
| RU | 2233470 | 7/2004 |
| TW | I253588 | 4/2006 |

OTHER PUBLICATIONS

Shen, John Paul et al., "Modern Processor Design: Fundamentals of Superscalar Processors", Oct. 9, 2002, McGraw-Hill, Beta edition, pp. 148-151.*

(Continued)

*Primary Examiner* — William B Partridge
(74) *Attorney, Agent, or Firm* — Peter Michael Kamarchik; Nicholas J. Pauley; Joseph Agusta (57) ABSTRACT

A multiple stage branch prediction system including a branch target address cache (BTAC) and a branch predictor circuit is disclosed. The BTAC is configured to store a BTAC entry. The branch predictor circuit is configured to store state information. The branch predictor circuit utilizes the state information to predict the direction of a branch instruction and to manage the BTAC entry based on the stored state information in response to actual resolution of the branch instruction.

14 Claims, 4 Drawing Sheets

(56) References Cited

OTHER PUBLICATIONS

Yeh et al.; "Two-Level Adaptive Training Branch Prediction"; 1991; ACM; pp. 51-61.*
International Search Report-PCT/US07/072317, International Search Authority-European Patent Office Mar. 25, 2008.
Songs S P et al: "The Power PC 604 RISC Microprocessor," IEEE Micro, IEEE Service Center, Los Alamitos, CA, US, vol. 14, No. 5, Oct. 1, 94, p. 8-17.
Written Opinion-PCT/US07/072317, International Search Authority-European Patent Office Mar. 25, 2008.
Taiwan Search Report-TW096123816—TIPO-Mar. 13, 2011.
Levitan D et al.,"The PowerPC 620(TM) microprocessor: a high performance superscalar RISC microprocessor", Compcon '95. 'Technologies for the Information Superhighway', Digest of Papers. United States, IEEE, May 9, 1995, pp. 285-291.
Quick Technical Report on "Strengthen Branch Prediction Mechanism," Nikkei Electronics, Nikkei Business Publications, Inc., May 9, 1994, No. 607, p. 10.
Technical News "Enhancement of Branch Prediction Mechanism," Nikkei Electronics, Nikkei Business Publications, Inc., May 9, 1994, No. 607, p. 10.
Perleberg C.H., et al., "Branch target buffer design and optimizaton", IEEE Transactions on Computers, U.S.A. IEEE, Apr. 1993, vol. 42, Issue: 4, pp. 396-412.

* cited by examiner

SYSTEM AND METHOD FOR SELECTIVELY MANAGING A BRANCH TARGET ADDRESS CACHE OF A MULTIPLE-STAGE PREDICTOR

BACKGROUND

1. Field of the Invention

The present invention relates generally to the field of processors and in particular to a method of improving branch prediction by proactively managing the contents of a branch target address cache.

2. Background

Microprocessors perform computational tasks in a wide variety of applications. Improved processor performance is almost always desirable, to allow for faster operation and/or increased functionality through software changes. In many embedded applications, such as portable electronic devices, conserving power is also a goal in processor design and implementation.

Many modern processors employ a pipelined architecture, where sequential instructions, each having multiple execution steps, are overlapped in execution. For improved performance, the instructions should flow continuously through the pipeline. Any situation that causes instructions to stall in the pipeline can detrimentally influence performance. If instructions are flushed from the pipeline and subsequently re-fetched, both performance and power consumption suffer.

Most programs include conditional branch instructions, the actual branching behavior of which is not known until the instruction is evaluated deep in the pipeline. To avoid the stall that would result from waiting for actual evaluation of the branch instruction, modern processors may employ some form of branch prediction, whereby the branching behavior of conditional branch instructions is predicted early in the pipeline. Based on the predicted branch evaluation, the processor speculatively fetches (prefetches) and executes instructions from a predicted address—either the branch target address (if the branch is predicted to be taken) or the next sequential address after the branch instruction (if the branch is predicted not to be taken). Whether a conditional branch instruction is to be taken or not to be taken is referred to as determining the direction of the branch. Determining the direction of the branch may be made at prediction time and at actual branch resolution time. When the actual branch behavior is determined, if the branch was mispredicted, the speculatively fetched instructions must be flushed from the pipeline, and new instructions fetched from the correct next address. Prefeteching instructions in response to an erroneous branch prediction can adversely impact processor performance and power consumption. Consequently, improving the accuracy of branch prediction is an important processor design goal.

One known form of branch prediction includes partitioning branch prediction into two predictors: an initial branch target address cache (BTAC) and a branch history table (BHT). The BTAC, also known as a branch target buffer (BTB), is indexed by an instruction fetch address and contains the next fetched address, also referred to as the branch target, corresponding to the instruction fetch address. Entries are added to a conventional BTAC after a branch instruction has passed through the processor pipeline and its branch has been taken. If the conventional BTAC is full, entries are conventionally removed from the BTAC using standard cache replacement algorithms (such as round robin or least-recently used) when the next entry is being added.

BTACs, in general, are often embodied as a highly-associative cache design and accessed early in the fetch pipeline. If the fetch address matches a BTAC entry (a BTAC hit), the corresponding next fetch address or target address is fetched in the next cycle. This match and subsequent fetching of the target address is referred to as an implicit taken branch prediction. If there is no match (a BTAC miss), the next sequentially incremented address is fetched in the next cycle. This no match situation is also referred to an implicit not-taken prediction.

BTACs, in general, are utilized in conjunction with a more accurate individual branch direction predictor such as the branch history table (BHT) also known as a pattern history table (PHT). Conventional BHTs are accessed later in the pipeline than a conventional BTAC. As such, additional information may be potentially present in order to make a better prediction. A conventional BHT may contain a set of saturating predicted direction counters to produce a more accurate taken/not-taken decision for individual branch instructions. For example, each saturating predicted direction counter may comprise a 2-bit counter that assumes one of four states, each assigned a weighted prediction value, such as:

11—Strongly predicted taken
10—Weakly predicted taken
01—Weakly predicted not taken
00—Strongly predicted not taken BHTs, in general, are conventionally indexed by bits stored in a branch history register (BHR). The output of a conventional BHT is a taken or not taken decision which results in either fetching the target address of the branch instruction or the next sequential address in the next cycle. The BHT is commonly updated with branch outcome information as it becomes known.

Utilizing a conventional BHT, a processor may override an earlier implicit prediction made by a BTAC. For example, a BTAC may hit (implicitly predicting a taken branch), but the BHT may override the BTAC implicit prediction with a not taken prediction. Conversely, following a BTAC miss, the BHT may override the BTAC miss with a taken prediction provided the target address is now known at this point in the processor pipeline.

Overriding BTAC predictions by a BHT results in wasted cycles resulting from flushing the processor pipeline. Overriding BTAC predictions by a BHT can happen repeatedly when a similar branch instruction is subsequently processed by the pipeline. For example, if the BTAC implicitly predicts taken by a match being found in the BTAC, instructions from the target address (taken branch) begin to be fetched in to the processor pipeline. If the BHT subsequently overrides the BTAC prediction by deciding that the branch should not be taken, all the instructions after the fetching of the target address have to be flushed from the pipeline. In this conventional branch prediction technique, this cycle potentially repeats itself for the same branch instruction subsequently fetched. This problem of repeating branch prediction conflicts on subsequent fetching of the same conditional branch instruction is referred to herein as the multiple flush cycle problem. In a conventional approach, the multiple flush cycle problem may continue to exist for a conditional branch instruction until the BTAC is updated. Therefore, it is recognized that apparatus and methods are needed to proactively manage the BTAC and reduce the probability of the occurrence of the multiple flush cycle problem.

SUMMARY

According to one or more embodiments, a branch target address cache (BTAC) and a branch predictor circuit are disclosed. The BTAC is configured to store a BTAC entry. The branch predictor circuit is configured to store state information. The branch predictor circuit utilizes the state information to predict the direction of a branch instruction and to manage the BTAC entry based on the stored state information in response to actual resolution of the branch instruction. By managing the BTAC entry based on state information used to predict the direction of a branch instruction, the likelihood of mispredictions and conflicts between BTAC lookup and a branch predictor circuit are advantageously reduced.

One embodiment relates to a multiple stage branch prediction system. The multiple stage branch prediction system includes a BTAC and a branch predictor circuit. The BTAC is configured to store a BTAC entry. The branch predictor circuit is configured to store state information. The branch predictor circuit utilizes the state information to predict the direction of a branch instruction and manages the BTAC entry based on the stored state information in response to actual resolution of the branch instruction.

Another embodiment relates to a method of managing a branch target access cache (BTAC). A branch direction of a conditional branch instruction which has been actually resolved is received. State information of a branch predictor circuit is evaluated in response to the received branch direction. An entry in the BTAC associated with the conditional branch instruction is managed according to the state information of the branch predictor circuit.

Another embodiment relates to a method for lowering the probability of a multiple flush cycle of a pipeline. In this method, a first direction for a conditional branch instruction is implicitly predicted. Also, a second direction for the conditional branch instruction is predicted based on state information. A BTAC entry associated with the conditional branch instruction is managed utilizing state information.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

Figure 1:
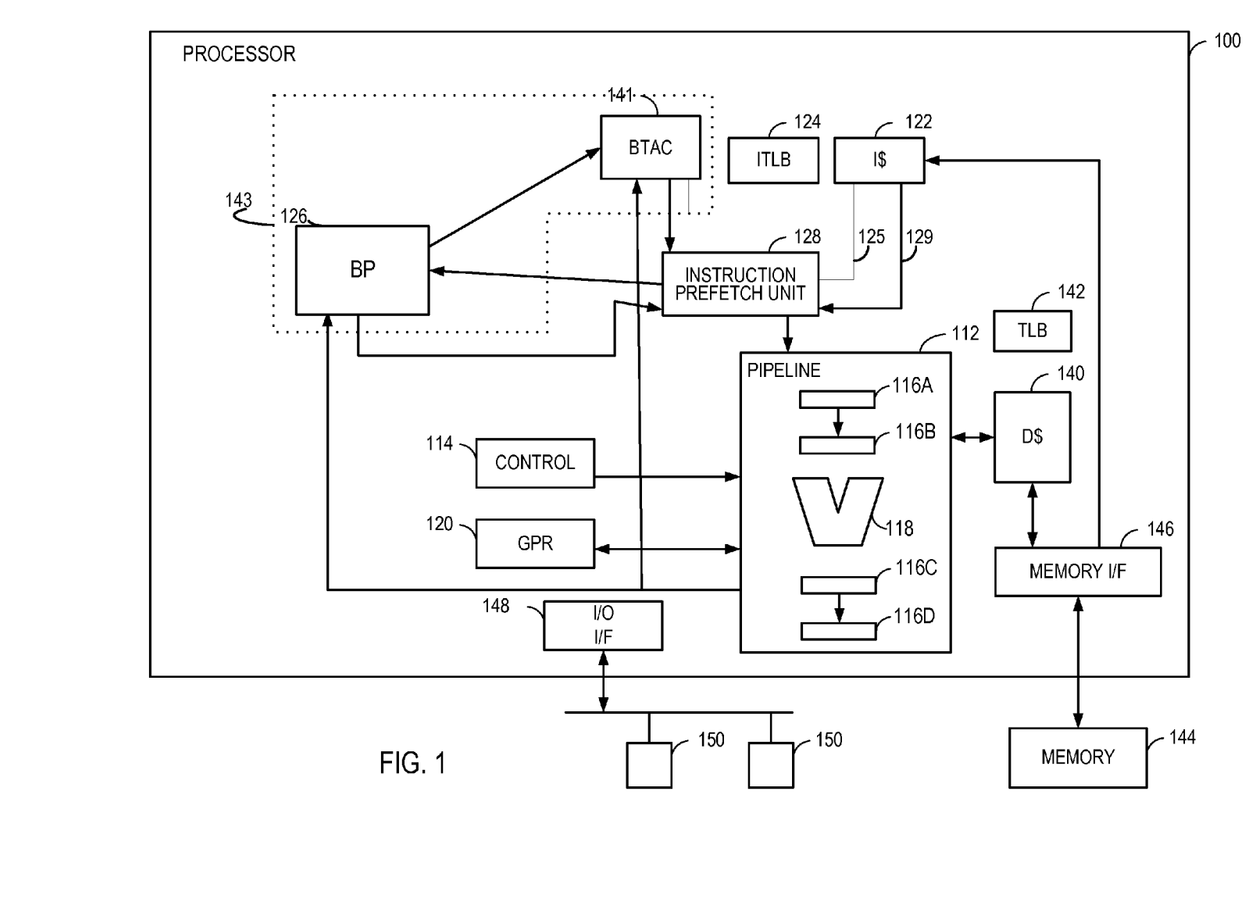
FIG. 1 is a functional block diagram of a processor.

FIG. 1 depicts a functional block diagram of a processor 100. The processor 100 executes instructions in an instruction execution pipeline 112 according to control logic 114. In some embodiments, the pipeline 112 may be a superscalar design, with multiple parallel pipelines. The pipeline 112 includes various registers or latches 116A-D, organized in pipe stages, and one or more execution units such as arithmetic logic unit (ALU) 118. A General Purpose Register (GPR) file 120 provides registers comprising the top of the memory hierarchy.

Data is accessed from a data cache (D-cache) 140, with memory address translation and permissions managed by a main Translation Lookaside Buffer (TLB) 142. In various embodiments, the ITLB 124 may comprise a copy of part of the TLB 142. Alternatively, the ITLB 124 and TLB 142 may be integrated. Similarly, in various embodiments of the processor 100, the I-cache 122 and D-cache 140 may be integrated, or unified. Misses in the I-cache 122 and/or the D-cache 140 cause an access to main (off-chip) memory 144, under the control of a memory interface 146.

The processor 100 may include an Input/Output (I/O) interface 148, controlling access to various peripheral devices 150. Those of skill in the art will recognize that numerous variations of the processor 100 are possible. For example, the processor 100 may include a second-level (L2) cache for either or both the I and D caches 122, 140. In addition, one or more of the functional blocks depicted in the processor 100 may be omitted from a particular embodiment.

Processor 100 includes a multiple stage branch prediction system 143. The multiple stage branch prediction system 143 includes a BTAC 141 (the first stage) and a branch predictor circuit 126 (the second stage). The BTAC 141 is configured to store one or more entries where each entry contains a branch target address corresponding to a fetch address. Instruction prefetch unit 128 fetches instructions from an instruction cache (I-cache or I$) 122, with memory address translation and permissions managed by an Instruction-side Translation Lookaside Buffer (ITLB) 124. The multiple stage branch prediction system 143 determines whether a fetch address hits in the BTAC 141, predicts the direction of a branch instruction by utilizing stored prediction patterns in the branch predictor circuit 126, and updates the BTAC 141 based on the state of the stored prediction patterns in the branch predictor circuit 126. The multiple stage branch prediction system 143 as well as the operation of the instruction prefetch unit 128 and pipeline 112 will be described in more detail in connection with the discussion of FIG. 2.

Figure 2:
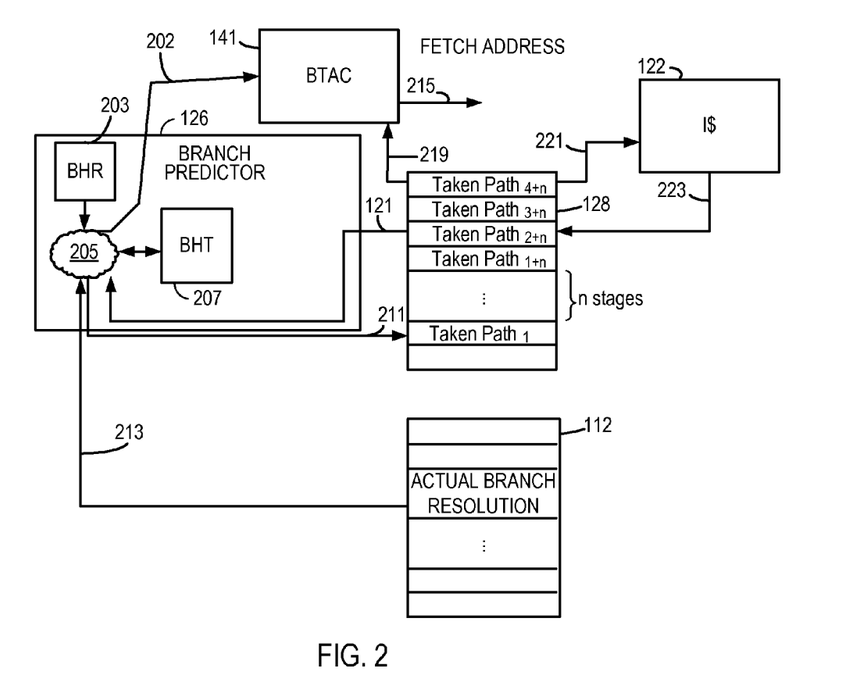
FIG. 2 is a functional block diagram of the branch predictor system of FIG. 1.

FIG. 2 is a functional block diagram of the branch predictor system 143 of FIG. 1. The pipeline 112 and the instruction prefetch unit 128 each include one or more processing stages. Branch predictor circuit 126 may include a branch history register 203, branch history table (BHT) 207 and branch table update and prediction logic circuit 205. Exemplary embodiments of the BTAC management portion of the branch table update and prediction logic circuit 205 will be described in connection with FIGS. 3 and 4.

In operation, a fetch address is looked up in BTAC 141 over path 219 to determine if it corresponds to a taken branch instruction, which has been previously processed by the pipeline 112. The instruction prefetch unit 128 speculatively prefetches instructions from the instruction cache 122 over path 221, beginning at the branch target address returned from the BTAC 141 for branches implicitly predicted "taken", or beginning at the next sequential address for branches implicitly predicted "not taken." In either case, the prefetched instructions are loaded into instruction prefetch unit 128 along path 223.

As the conditional branch instruction is processed by the stages of the instruction prefetch unit 128 or pipeline 112, additional information about the conditional branch instruction is determined such as information carried in predecode bits retrieved from the I-cache 122 over path 223. The branch predictor circuit 126, utilizing stored prediction patterns and this additional information, is invoked over path 121 in order to predict with a higher level of confidence than the BTAC lookup the direction of the conditional branch instruction.

The branch table update and prediction logic circuit 205 utilizes the branch instruction address, the branch history register (BHR) 203 and the branch history table (BHT) 207 to predict the direction of the conditional branch instruction. The BHR 203 acts as shift register for a conditional branch instruction. For example, if a conditional branch instruction is actually taken, a "1" is shifted into BHR 203. If the conditional branch instruction is actually not taken, a "0" is shifted into BHR 203, resulting in BHR 203 storing the historical branch direction for a particular branch instruction. In one embodiment, BHR 203 includes a specific register for each branch instruction processed by pipeline 112 over a period of time. In another embodiment, BHR 203 may have global scope which contains historical branch direction for recently processed conditional branch instructions. The BHT 207 may include two bit counters for a particular branch instruction as described in the Background section above. It is recognized that various known techniques for predicting branch direction may utilize the BHR 203 and BHT 207. It is also recognized that these known predictive techniques utilize various implementations of BHR 203 and BHT 207. It is also recognized that this disclosure contemplates utilizing other predictive techniques which implement alternatives to a BHR or a BHT.

Based on the BHR 203 and BHT 207, the branch direction predictor circuit 126, in the example illustrated in FIG. 2, predicts a branch direction which conflicts with the BTAC 141 implicit prediction. As a result, all of the instructions above "Taken Path$_1$", the stage location of the conditional branch instruction, will be flushed from the instruction prefetch unit 128. Without a conflict, the instruction prefetch unit 128 would continue to prefetch instructions which began from the branch target address.

As the conditional branch instruction progresses through the stages of pipeline 112, the conditional branch instruction reaches a stage where the condition is actually resolved. If the actual resolution of the branch differs from the prediction of the branch predictor circuit 126, all the instructions above the conditional branch instruction are flushed from both pipeline 112 and instruction prefetch unit 128. At the actual branch resolution stage of the pipeline, the actual direction of the conditional branch is sent to the branch predictor circuit 126 over path 213.

The branch table update and prediction logic circuit 205 is configured to utilize the actual branch direction in addition to the branch instruction address, the state of an entry in the BHT 207 and, optionally, the contents of the BHR 203 to update the contents of the BHT 207. Additionally, the branch table update and prediction logic circuit 205 is configured to manage an entry in BTAC 141 depending on the actual branch direction and the state of the BHT 207, or any other state in the branch direction predictor, advantageously allowing the entry in BTAC 141 to be responsive to the branch predictor circuit 126 and any branch prediction technique implemented by other branch predictor circuits storing state information utilized for branch prediction.

Figure 3:
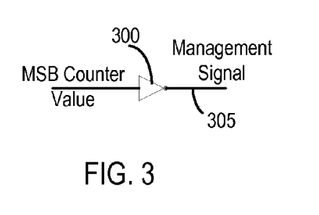
FIG. 3 is a functional block diagram of a first exemplary embodiment of a BTAC management signal circuit.

FIG. 3 is a functional block diagram of a first exemplary embodiment of a BTAC management circuit 300. The BTAC management circuit 300 may be a suitable circuit included in the branch table update and prediction logic circuit 205 to manage the BTAC 141 after the BHT 207 has been updated. The input to the BTAC management circuit 300 is the most significant bit, after being updated as a result of actual resolution, of a two bit counter value corresponding to the conditional branch instruction. The output signal 305 of the BTAC management circuit 300 is the inverted signal of the input. The BTAC 141 interprets the output signal 305 to determine whether to manage an entry corresponding to the conditional branch instruction as described below.

For example, if the updated two bit counter corresponding to the conditional branch instruction has value of 00 (strongly predicted not taken), the entry for this conditional branch instruction in BTAC 141 will be managed according to various alternatives described below. Similarly, if the updated two bit counter has value of 01 (weakly predicted not taken), the entry for this conditional branch instruction in BTAC 141 will be managed. If the updated two bit counter either has the value 10 (weakly predicted taken) or value 11 (strongly predicted taken), the entry in BTAC 141 will not be modified.

Figure 4:
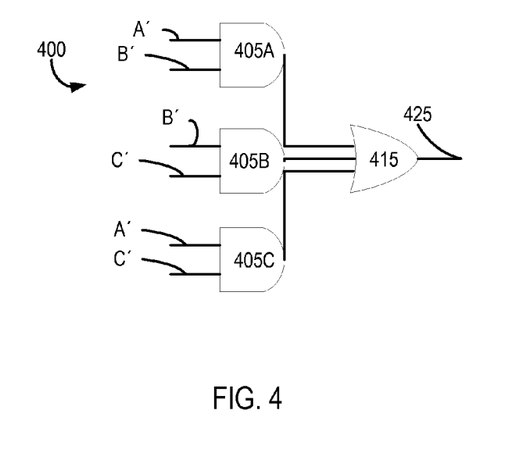
FIG. 4 is a functional block diagram of a second exemplary embodiment of a BTAC management signal circuit.

FIG. 4 is a functional block diagram of a second exemplary embodiment of a BTAC management signal circuit 400. The BTAC management circuit 400 may be a suitable circuit for a portion of the BTAC management portion of the branch table update and prediction logic circuit 205 to manage the BTAC 141 before the BHT 207 has been updated. The BTAC management circuit 400 is a logic circuit including AND gates 405A-405B and an OR gate 415 utilized to generate a management signal 425 to manage an entry corresponding to a conditional branch instruction which was actually resolved. The BTAC management circuit 400 operates in response to the actual direction of the branch and the current state of the BHT 207 before update resulting from the actual direction. The BTAC management circuit 400 has inputs A' (the actual branch direction inverted), B' (the most significant bit of the two-bit counter inverted), and C' (the least significant bit of the two-bit counter inverted). In this embodiment, the BTAC 141 would interpret the output signal 425 to manage an entry corresponding to the conditional branch instruction as described below. Although BTAC management circuits 300 and 400 have been described as being dependent on the implementation of BHT 207, they may also depend on a chosen implementation of a BHR. Furthermore, it is recognized that this disclosure contemplates other BTAC management circuits which are driven by various implementation of a BHT or implemented with various branch predictive implementations. Moreover, BTAC management circuits as shown in FIGS. 3 and 4 may be integrated with or separate from the branch table update and prediction logic circuit 205.

The type of management of the entry may include various alternatives. The types of management include removing the BTAC entry immediately, marking the BTAC entry for removal on the next added branch instruction, pinning or maintaining the BTAC entry for an extended period of time, and the like. It is recognized that management of the BTAC entries not associated with conditional branch instruction as an alternative to management of the BTAC entry associated with conditional branch instruction is contemplated by the present disclosure.

BTAC 141 employs a least recently used replacement policy where the entries are organized in an order which indicate the replacement order of entries in the BTAC 141. A known pseudo least recently used circuit may be suitable to maintain the replacement order of entries. As such, the output signal of the BTAC management circuit 300 may result in modifying the position of the entry corresponding to the conditional branch instruction in the BTAC 141. For example, the entry may be bumped up in the replacement order or bumped down in the replacement order. Alternatively, the entry may be maintained by adjusting the position in the BTAC 141 to indicate it is the most recently used in order to prolong its life in BTAC 141.

Alternatively, in another embodiment, BTAC 141 may employ a modified round robin policy. In a conventional round robin policy, a register points to an entry to be replaced the next time a conditional branch is added and sequentially steps to the next sequential entry after the entry is replaced, cycling through the entries in a fair manner. However, in the modified round robin policy, a pointer is employed to point to the entry corresponding to the conditional branch instruction which was actually resolved. For example, the entry corresponding to the conditional branch instruction may be marked for removal by adjusting the pointer to now point to this entry. In so doing, this entry is replaced the next time a conditional branch instruction and its corresponding target address are added to BTAC 141. Consequently, the next entry to be removed would be the entry recently determined to be removed. Although the replacement policies employed by BTAC 141 provided herein are exemplary, the inventive techniques are also applicable to other replacement policies typically used in BTACs.

Figure 5:
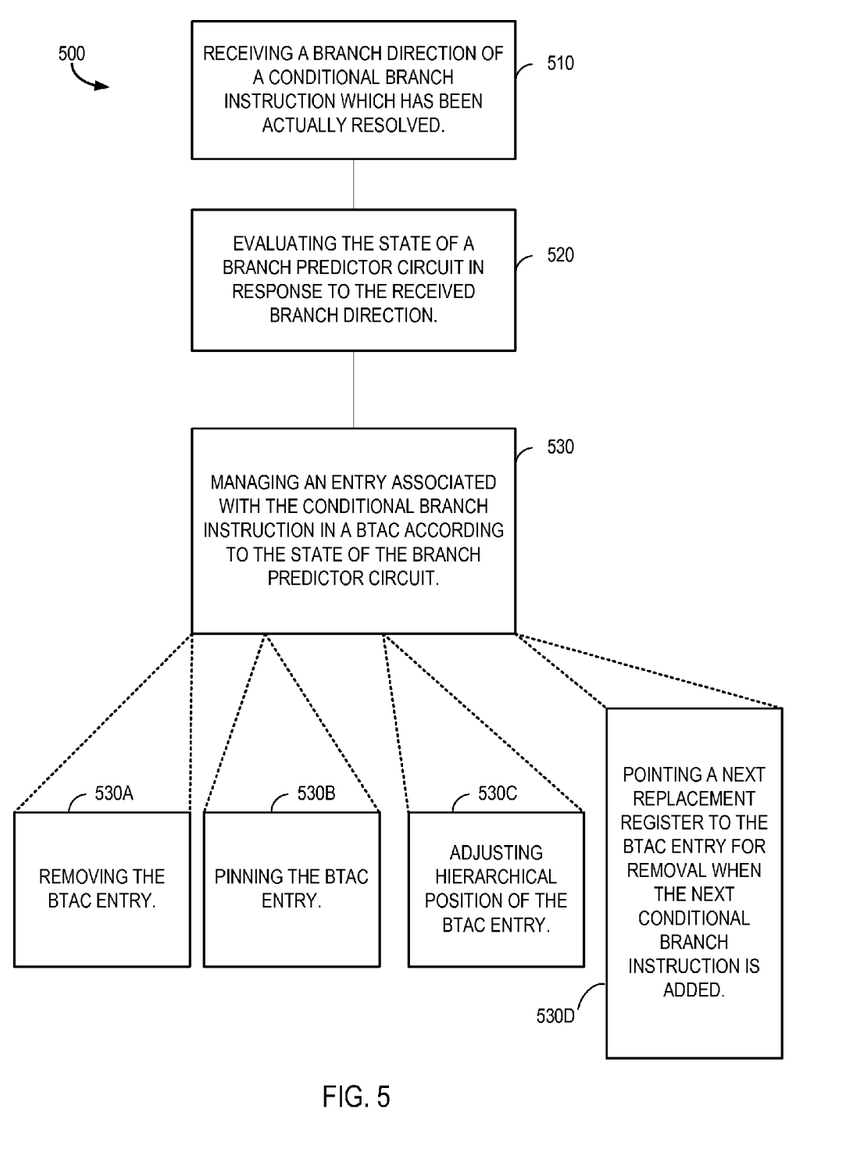
FIG. 5 is a flow chart illustrating a method of managing a BTAC.

FIG. 5 is a flow chart 500 illustrating a method of managing a BTAC. At block 510, a branch direction of a conditional branch instruction which has been actually resolved is received. For example, path 213 of FIG. 2 illustrates branch predictor circuit 126 as receiving the branch direction from pipeline 112. At block 520, the state of a branch predictor circuit is evaluated in response to receiving the actual branch direction. At block 530, an entry in a BTAC associated with the conditional branch instruction is managed according to the state of the branch predictor circuit.

Blocks 530A-530D are alternative exemplary embodiments of various types of management of an entry in the BTAC as shown in block 530. These exemplary embodiments may be employed singularly or in combination. At block 530A, the entry in the BTAC to be managed is removed, advantageously removing the last conditional branch instruction to be predicted "not taken" from the BTAC. At block 530B, the entry in the BTAC to be managed is maintained in the BTAC for an extended period of time, advantageously prolonging the life of the last conditional branch instruction to be predicted "taken" in the BTAC.

Block 530C shows the entry in the BTAC to be managed having its position in a replacement order adjusted for a BTAC employing a least recently used replacement policy. In one embodiment, the entry in the BTAC has its position in the replacement order modified in a manner to have the entry less likely to be replaced on the next BTAC entry to be added, advantageously prolonging the life of the last conditional branch instruction to be predicted "taken" in the BTAC. In another embodiment, the entry in the BTAC has its position in the replacement order modified in a manner to have the entry more likely to be replaced on the next BTAC entry to be added.

Block 530 D shows a next replacement register being adjusted for a BTAC employing a modified round robin replacement policy. In one embodiment, the contents of the next replacement register are modified to point to the entry to be managed in the BTAC. Thus, when the next conditional branch instruction is to be added to the BTAC, the pointed to entry is replaced with the added entry, advantageously removing the last conditional branch instruction to be predicted "not taken" from the BTAC. In another embodiment, the contents of the next replacement register are modified to point to the next entry in the BTAC after the entry to be managed. In this way, when the next conditional branch instruction is to be added to the BTAC, the next entry in the BTAC after the entry to be managed is replaced with the added entry, advantageously prolonging the life of the managed entry in the BTAC. It is recognized that other management techniques for managing a BTAC may be utilized by the present disclosure.

Figure 6:
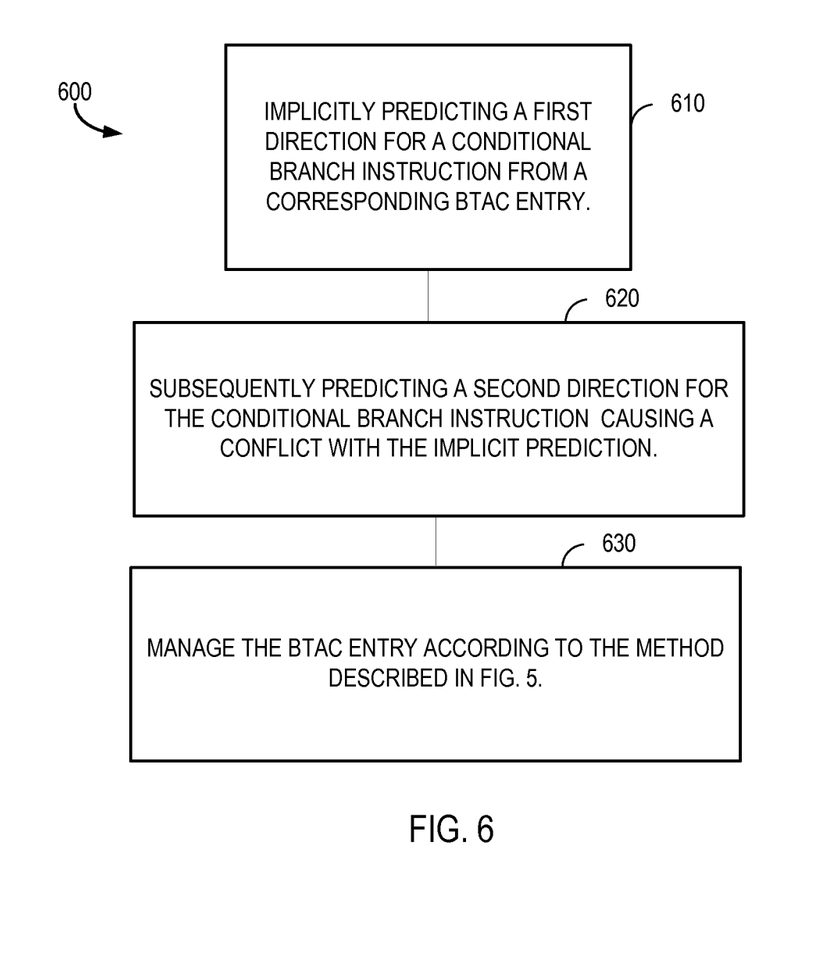
FIG. 6 is a flow chart illustrating a method for lowering the probability of the multiple flush cycle of a pipeline.

FIG. 6 is a flow chart illustrating a method 600 of lowering the probability of the multiple flush cycle of a pipeline. At block 610, a first direction for a conditional branch instruction is implicitly predicted. For example, if there is a hit in a BTAC for the conditional branch instruction, the corresponding branch target address in the BTAC is then prefetched. Thus, the branch direction is implicitly predicted "taken." At block 620, a second direction for the conditional branch instruction is subsequently predicted based on state information such as state information stored in branch prediction circuit 126. Continuing with the previous example, a branch predictor circuit predicts that the conditional branch instruction should be "not taken," thus, conflicting with the implicit prediction of the BTAC. At block 630, the BTAC entry associated with the conditional branch instruction is managed utilizing state information stored, for example, in branch prediction circuit 126. Different types of BTAC management are described above in connection with the discussion of FIG. 5. Alternatively, at block 630, the BTAC entry associated with the conditional branch instruction is managed due to the conflict between the branch predictor circuit and the BTAC lookup independent of any state stored in the branch predictor circuit.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of embodiments, it will be recognized that a wide variety of implementations may be employed by persons of ordinary skill in the art consistent with the above discussion and the claims which follow below.

What is claimed is:

1. A multiple stage branch prediction system comprising:
a branch target address cache (BTAC) configured to store a BTAC entry; and
a branch predictor comprising:
predicted direction counter, the predicted direction counter associated with a branch instruction;
a history register circuit, the history register circuit storing a historical branch direction of the branch instruction; and
a logic circuit configured to:

predict a first direction associated with the branch instruction, wherein the first direction is predicted based on the BTAC entry, wherein the first direction is used to speculatively prefetch a subsequent instruction into an instruction prefetch unit;

predict a second direction of the branch instruction, wherein the second direction is predicted based on the predicted direction counter, wherein in response to the second direction conflicting with the first direction, the subsequent instruction is flushed from the instruction prefetch unit and an other instruction is prefetched into the instruction prefetch unit, wherein the other instruction is selected to be prefetched based on the second direction;

modify a value of the predicted direction counter, wherein the modified value of the predicted direction counter is based on actual resolution of the branch instruction, the value in the predicted direction counter, but not information stored in the history register circuit; and generate a management signal to manage the BTAC entry based on the modified value of the predicted direction counter.

2. The system of claim 1, wherein when a second BTAC entry is indicated as a most recently used BTAC entry, the logic circuit is configured to indicate the BTAC entry as the most recently used BTAC entry in response to the management signal.

3. The system of claim 1, wherein the subsequent instruction is flushed from the instruction prefetch unit prior to the branch instruction entering an instruction execution pipeline and the other instruction is prefetched prior to the branch instruction entering the instruction execution pipeline.

4. The system of claim 1, wherein the BTAC and the branch predictor are disposed in a processor.

5. The system of claim 1, wherein the history register circuit comprises a plurality of registers, each register storing a corresponding historical branch direction associated with a corresponding branch instruction processed by a pipeline within a time period.

6. A method comprising:
storing a historical branch direction of a branch instruction in a history register circuit;
using a predicted direction counter to predict a direction of the branch instruction;
modifying a value of the predicted direction counter, wherein the modified value of the predicted direction counter is based on actual resolution of the branch instruction, the value in the predicted direction counter, but not information stored in the history register circuit; and
generating a management signal to manage a branch target address cache (BTAC) entry based on the modified value of the predicted direction counter.

7. The method of claim 6, wherein a first predicted direction associated with the branch instruction is determined based on the BTAC entry, wherein the first predicted direction is used to speculatively prefetch a subsequent instruction into an instruction prefetch unit, and further comprising, in response to the direction predicted using the predicted direction counter conflicting with the first prediction direction, flushing the subsequent instruction from the instruction prefetch unit and prefetching another instruction into the instruction prefetch unit, wherein the other instruction is selected to be prefetched based on the direction predicted using the predicted direction counter.

8. The method of claim 7, wherein the subsequent instruction is flushed from the instruction prefetch unit prior to the branch instruction entering an instruction execution pipeline and the other instruction is prefetched prior to the branch instruction entering the instruction execution pipeline.

9. The method of claim 6, wherein using the predicted direction counter, modifying the predicted direction counter, and generating the management signal based on the modified value of the predicted direction counter are performed by a processor.

10. The method of claim 6, wherein the history register circuit comprises a plurality of registers, each register storing a corresponding historical branch direction associated with a corresponding branch instruction processed by a pipeline within a time period.

11. A multiple stage branch prediction system comprising:
means for storing a first entry to be indexed by an instruction fetch address and including a next fetch address;
means for storing a predicted direction counter associated with a branch instruction;
means for storing a historical branch direction of the branch instruction in a history register circuit;
means for utilizing the predicted direction counter to predict a direction of the branch instruction;
means for modifying a value of the predicted direction counter, wherein the modified value of the predicted direction counter is based on actual resolution of the branch instruction, the value in the predicted direction counter, but not information stored in the history register circuit; and
means for generating a management signal to manage the first entry based on the modified value of the predicted direction counter.

12. The system of claim 11, wherein the first entry is an entry of a branch target address cache (BTAC).

13. The system of claim 12, wherein when a third entry of the BTAC is indicated as a most recently used BTAC entry, a means for managing the BTAC is configured to indicate the first entry as the most recently used BTAC entry in response to the management signal to manage the first entry.

14. The system of claim 11, wherein a first predicted direction is associated with the branch instruction based on the first entry, wherein the first predicted direction is used to speculatively prefetch a subsequent instruction into an instruction prefetch unit, and wherein in response to the direction predicted using the predicted direction counter conflicting with the first predicted direction, the subsequent instruction is flushed from the instruction prefetch unit and another instruction is prefetched into the instruction prefetch unit, wherein the other instruction is selected to be prefetched based on the direction predicted using the predicted direction counter.

* * * * *